Feb. 23, 1960 A. E. POWELL 2,926,217

COMMUNICATION SYSTEM

Filed July 5, 1957 2 Sheets-Sheet 1

INVENTOR.
ALBERT E. POWELL
BY John P. Chandler
HIS ATTORNEY.

Feb. 23, 1960 A. E. POWELL 2,926,217

COMMUNICATION SYSTEM

Filed July 5, 1957 2 Sheets-Sheet 2

INVENTOR.
ALBERT E. POWELL
BY John P. Chandler
HIS ATTORNEY.

United States Patent Office 2,926,217

Patented Feb. 23, 1960

2,926,217

COMMUNICATION SYSTEM

Albert E. Powell, Chatham, N.J., assignor to Byford Labs, Inc., Mamaroneck, N.Y., a corporation of New York Application July 5, 1957, Serial No. 669,980

10 Claims. (Cl. 179—15)

This invention relates to a communication system for sending and receiving information carried by a train of pulses. The invention has particular reference to means for selectively spacing a plurality of pulses by means of a magnetostrictive delay line both in the transmitting circuit and in the receiving circuit. Information may be conveyed by amplitude modulation of the pulses in the train or by the spacing between pulses.

Communication systems employing short discrete pulses have been used in the past and various methods of modulation have been employed for carrying information from a transmitting circuit to a receiving circuit. Such prior art systems have not been secret and have contained no selective means for actuating a receiving circuit to eliminate unwanted signals. Also, the signal-to-noise ratio has been the same as in other systems of communication because, in general, the receiving circuit is set to receive signals at all times and therefore collects all the noise intermediate reception of desired signals.

The present system of communication transmits a train of pulses preceded by two identifying pulses which operate a coincidence circuit at the receiving station to open electronic gates for a short time interval only and permit the train of waves to be transferred to a utilization circuit in synchronism, thereby eliminating a large percentage of the noise which otherwise would be present along with the received signals.

One of the objects of this invention is to provide an improved communication system which avoids one or more of the disadvantages and limitations of prior art systems.

Another object of the invention is to provide a communication means which can transmit and receive a plurality of related pulses during a single time interval, all of said pulses containing information.

Another object of the invention is to provide a means of synchronizing a plurality of message carrying pulses by the use of two or more identifying pulses and a coincidence circuit.

Another object of the invention is to reduce the signal to noise ratio by applying the received information to a utilization circuit during a very small time interval.

Another object of the invention is to reduce the cost and complexity of multiplex communication systems by employing magnetostrictive delay lines for spacing a train of pulses at the transmitting station and for synchronizing these pulses at a receiving station.

The communication system comprises a pulse transmitting circuit for transmitting an identifiable train of modulated pulses and a pulse receiving circuit for selectively receiving the train. The transmitting circuit includes a pulse generator which generates a short current pulse and applies it to a magnetostrictive delay line. As the pulse travels along the line it generates voltage pulses in a plurality of primary coils spaced along the line, these pulses constituting the train identity means. A plurality of secondary coils also spaced along the line generate voltage pulses which are later modulated to carry information. The receiving circuit includes the usual receiving means which generate timed current pulses responsive to the transmitted train. These pulses are applied to a second magnetostrictive delay line by a coil which is connected to the receiving circuit. A plurality of primary coils spaced along the line produce synchronizing pulses which identify the pulse train and these synchronized pulses are applied to a coincidence circuit which produces a gating signal and opens gates to permit a plurality of secondary coils to send synchronized voltage pulses to a utilization circuit.

Figure 1:
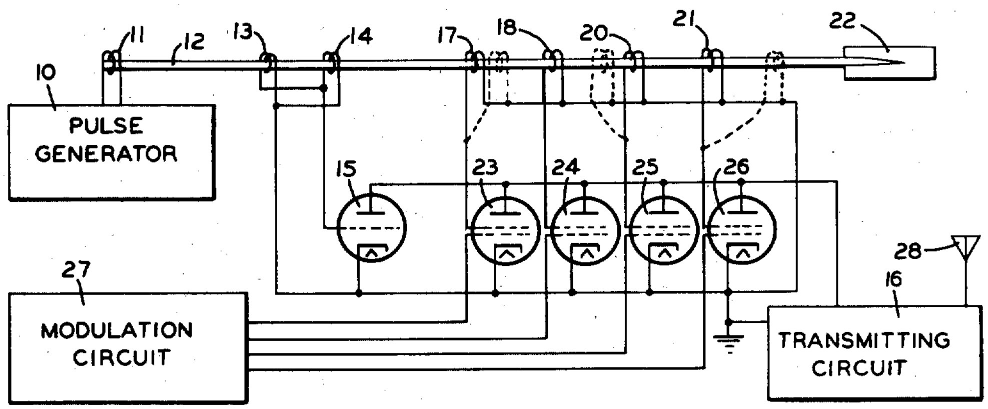
Fig. 1 is a schematic diagram of connections showing the transmitting circuit with some of the components shown in block.

Referring now to Fig. 1, the transmitting circuit includes a pulse generator 10 which is arranged to generate single pulses at a specified time interval. These pulses are applied to a transmitting coil 11 which encloses the end portion of a magnetostrictive delay line 12. A short distance from transmitting coil 11 are two receiving coils 13 and 14 which are spaced from each other a predetermined distance. Coils 13 and 14 are primary coils and may be connected in parallel with each other and to the input circuit of an amplifier tube 15 which is coupled to a transmitting circuit 16.

A plurality of secondary coils 17, 18, 20 and 21 are also spaced along delay line 12 a predetermined distance from each other, all the receiving coils acting to pick up and generate a voltage pulse as the magnetostrictive pulse passes along line 12. A damping means 22 may be placed at the end of the line to reduce reflection. Each of the secondary coils is connected to the input circuit of a series of amplifier tubes 23, 24, 25 and 26, this connection being preferably made to one of the control electrodes in a tetrode or pentode electron discharge device. The anode-cathode circuit of these amplifier tubes are also connected to the transmitting circuit 16 which in turn is connected to an antenna 28 or other suitable means for transferring electrical waves to a distant receiving circuit.

The system described above produces a train of pulses which may be modulated in a number of ways. One modulation system includes amplitude modulation which may be accomplished by applying a series of voltages to a second control electrode in tubes 23, 24, 25 and 26 by means of a modulation circuit 27.

Figure 2:
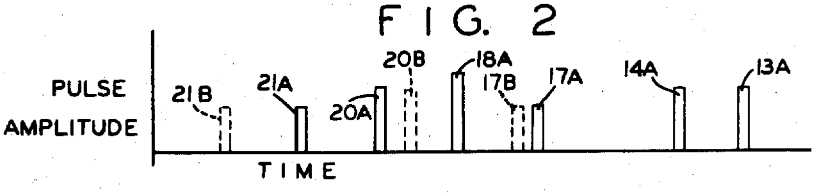
Fig. 2 is a graph showing the pulse train as it is delivered to the transmitting circuit, the equally spaced generated pulses shown being modulated in position or time under control of the modulation circuits.

When this transmitting circuit is in operation a single pulse applied to coil 11 generates a magnetostrictive pulse in line 12 which travels the entire length of the line and is absorbed by damper 22. During its travel the pulse generates voltage pulses in all six of the coils surrounding the line, the first two of these being applied to tube 15 and being transmitted directly to the transmitting circuit without modulation. The four pulses generated by coils 17, 18, 20 and 21 are applied to their associated amplifier tubes and then transmitted to transmitting circuit 16 with varying degrees of modulation. The result of this operation is a series of pulses which are indicated in the graph shown in Fig. 2 where pulses 13A and 14A are the pulses generated by coils 13 and 14 and the pulses 17A, 18A, 20A and 21A are the pulses generated by the four secondary coils, the graph indicating the time separation of the pulses as they are supplied to transmitting circuit 16.

It is obvious that the pulse spacing can be modified by changing the position of the coils on the first line 12 and if this is done pulse 17A may appear on the line as 17B and the pulse generated by coil 20 can be spaced to appear at position 20B. This alternate spacing is shown in Fig. 3 and indicates the wide variety of combinations obtainable by locating the secondary coils at various positions along the line.

Figure 3:
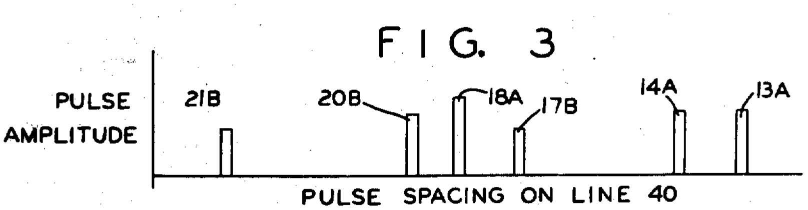
Fig. 3 is a graph showing an alternate spacing of pulses which results when some of the secondary coils of Fig. 1 are moved to a different location on the first magnetostrictive delay line.
Figure 4:
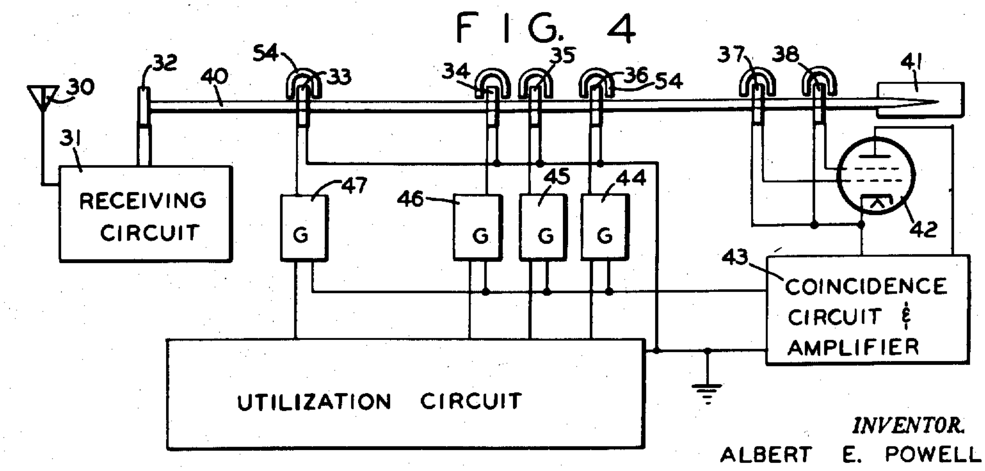
Fig. 4 is a schematic diagram of connections of the receiving circuit designed to receive pulse signals sent out by the circuit shown in Fig. 1.

The circuit shown in Fig. 4 is a receiving circuit for receiving the train of pulses shown in Fig. 3 and includes a receiving antenna 30, a receiving circuit 31, a transmitting coil 32, a series of four secondary coils 33, 34, 35 and 36, these coils being spaced in similar manner to the pulses shown directly above them in Fig. 3. Coils 37 and 38 are coils used for identification and are positioned directly below pulses 14A and 13A shown in Fig. 3. All the coils enclose a second magnetostrictive delay line 40 which is terminated by a damping means 41 to reduce reflections.

Figure 6:
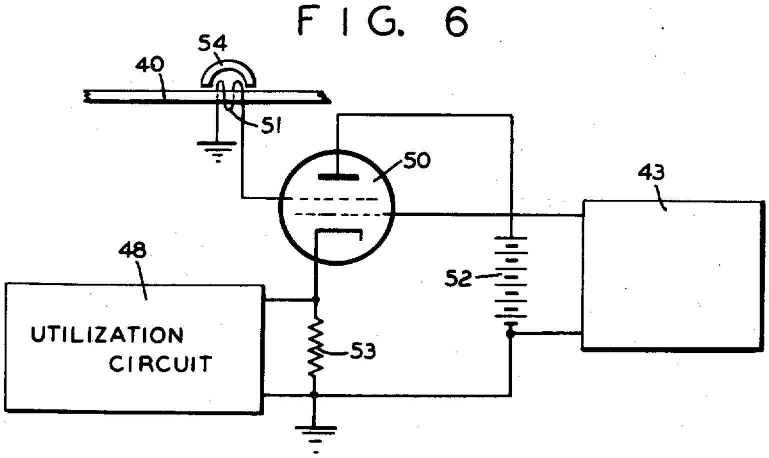
Fig. 6 is a schematic diagram of connections of a gate circuit which may be used in the blocks shown in Fig. 4.

The receiving circuit also includes a coincidence tube 42 which may be a tetrode having two control electrodes, each of which is connected to one of the coils 37 and 38. The anode-cathode circuit of tube 42 is connected to an amplifier circuit 43 which controls four gates 44, 45, 46 and 47, each of the gates being connected between one of the secondary coils and a utilization circuit 48. One form of a suitable gate circuit is shown in detail in Fig. 6 and includes an amplifier tube 50 having two control electrodes. One of the control electrodes is connected to one of the secondary coils 51 while the second control electrode is connected to the coincidence circuit 43. Amplifier tube 50 may have its output circuit coupled in a number of ways to transfer information to a utilization circuit 48. The circuit shown in Fig. 6 is a cathode follower type of circuit and includes a source of potential 52 and a cathode resistor 53. The potentials of the control electrodes are adjusted so that no current can flow through the tube 50 unless potential is supplied to both control electrodes at the same time.

The operation of the receiving circuit is as follows: The voltage pulses as indicated in Fig. 3 are received by antenna 30 and receiving circuit 31 which applies current pulses to coil 32 and produces magnetostrictive pulses in line 40. These pulses travel along the line and as each pulse passes a coil a voltage is generated in the coil and applied to its associated circuit. However, all the circuits connected to coils 33 to 38 are normally non-conductive and the application of single pulses to these circuits produces no results. When the train of pulses reaches the position along the line as indicated in Fig. 3 magnetostrictive pulses 13A and 14A simultaneously produce voltage pulses in coils 37 and 38, thereby applying a positive potential to both the control electrodes in electron discharge device 42. Tube 42 is now rendered conductive and applies a gating pulse through amplifier circuit 43 to the four gates 44, 45, 46 and 47, opening these gates at the same time that the four pulses 17B, 18A, 20B and 21B are passing through coils 33 to 36. The four voltage pulses generated in these coils are applied through the gates in synchronism and are received simultaneously by utilization circuit 48. It will be obvious from the above description that the utilization circuit is connected to receive information for a very small time interval during the cycle represented by a single pulse delivered to coil 11. The gates may be open only 1% of this time duration and therefore are subject to only 1% of the noise received by antenna 30.

The above described operations of the receiving and transmitting circuits cover the time during which a single pulse is sent from pulse generator 10. It is contemplated that pulse generator 10 is arranged to produce a succession of single pulses for an indefiinite period and each single pulse so produced will result in the train of six transmitted pulses as described. In the example given two identifying pulses 13A and 14A have been generated by coils 13 and 14 and received by coils 37 and 38. It will be obvious that any number of coils greater than two may be employed for signal train identification, the pulse spacing being in agreement with the coil spacing.

It is well known that receiving coils such as those shown on magnetostrictive lines 12 and 40 require a magnetic bias. This bias may be provided by a direct current component in the coils or it may be provided by a small permanent magnet 54 as indicated in Figs. 4 and 6.

Figure 5:
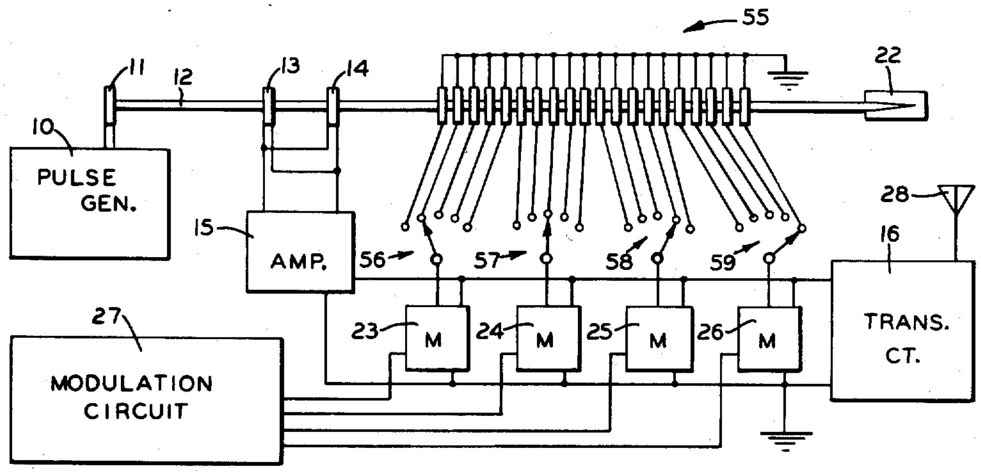
Fig. 5 is a schematic diagram of connections of an alternate receiving circuit which can be employed for receiving a variety of pulse trains.

The transmitting circuit shown in Fig. 5 is similar to that shown in Fig. 1 except that a large number of receiving coils 55 are shown surrounding magnetostrictive line 12. Only four receiving positions are used, as before, these positions being adjustable by means of multiple contact switches 56, 57, 58 and 59. These switches are set for any predetermined array of transmitted pulses and a similar arrangement must be available at the receiving circuit to provide coil positions similar to the transmitting coil positions. Otherwise the circuit shown in Fig. 5 operates in the same manner as the circuit shown in Fig. 1.

While there have been described and illustrated specific embodiments of the invention, it will be obvious that many changes and modifications can be made in the coincidence circuit and in the gating circuits without departing from the field of the invention which should be limited only by the scope of the appended claims.

I claim:

1. A communication system comprising a pulse transmitting circuit for transmitting an identifiable train of modulated pulses and a pulse receiving circuit for selectively receiving said train, said transmitting circuit including a pulse generator for generating a current pulse, a first magnetostrictive delay line, a transmitting coil connected to the pulse generator and enclosing said first line for generating magnetostrictive pulses therein, a plurality of primary coils enclosing portions of the line in spaced relation for generating timed voltage pulses which selectively identify the transmitted train, and a plurality of secondary coils enclosing portions of the line in spaced relation for producing timed voltage pulses which are modulated to carry information; said receiving circuit including receiving means for generating timed current pulses responsive to said transmitted pulse train, a second magnetostrictive delay line, a receiving coil connected to the receiving means and enclosing a portion of the second line for generating magnetostrictive pulses therein, a plurality of primary coils enclosing portions of the second line in spaced relation for producing synchronized pulses which identify the pulse train, a coincidence circuit which produces a gating signal only when actuated by said synchronized pulses, a plurality of secondary coils enclosing portions of the second line in spaced relation for producing synchronized voltage pulses, and a gate circuit connected to each of said secondary coils and operated by a pulse from the coincidence circuit for passing said synchronized modulated pulses to a utilization circuit.

2. A communication system comprising a pulse transmitting circuit for transmitting an identifiable train of amplitude modulated pulses and a pulse receiving circuit for selectively receiving said train, said transmitting circuit including a pulse generator for generating a current pulse, a first magnetostrictive delay line, a transmitting coil connected to the pulse generator and enclosing a portion of said first line for receiving a current pulse and for generating a magnetostrictive pulse in the line, a plurality of primary coils enclosing portions of the line in spaced relation for generating timed voltage pulses from said magnetostrictive pulse which selectively identify the transmitted train, and a plurality of secondary coils enclosing portions of the line in spaced relation for producing voltage pulses from said magnetostrictive pulse which are amplitude modulated to carry information; said receiving circuit including means for generating timed current pulses responsive to said transmitted pulse train, a second magnetostrictive delay line, a receiving coil connected to the receiving means and enclosing a portion of the second line for generating magnetrostrictive pulses therein, a plurality of primary coils enclosing portions of the second line in spaced relation for producing synchronized pulses which identify the pulse train, a coincidence circuit which produces a gating signal only when actuated by said synchronized pulses, a plurality of secondary coils enclosing portions of the second line in spaced relation for producing synchronized voltage pulses, and a gate circuit connected to each of said secondary coils and operated by a pulse from the coincidence circuit for passing said synchronized amplitude modulated pulses to a utilization circuit.

3. A transmitting circuit for a communication system comprising a pulse generator for generating a current pulse, a magnetostrictive delay line, a transmitting coil connected to the pulse generator and enclosing a portion of the line for generating a magnetostrictive pulse therein, two primary coils enclosing portions of the line in spaced relation along the line and connected to each other, said primary coils for generating timed voltage pulses which identify a transmitted train of pulses, and a plurality of secondary coils enclosing portions of the line in spaced relation for producing timed voltage pulses which constitute said train and are modulated to carry information.

4. A transmitting circuit as claimed in claim 3 wherein modulating means are provided for modulating the pulses by the secondary coils, said modulation representing information.

5. A transmitting circuit as claimed in claim 4 wherein said modulating means includes amplitude modulating electronic circuits.

6. A receiving circuit for a communication system comprising receiving means for providing timed current pulses responsive to a received pulse train, a magnetostrictive delay line, a receiving coil connected to the receiving means and enclosing a portion of said line for generating magnetostrictive pulses in the line, a plurality of primary coils enclosing portions of the line in predetermined spaced relation for producing synchronized pulses which identify the pulse train, a coincidence circuit which produces a gating signal only when actuated by all of said synchronized pulses, a plurality of secondary coils enclosing portions of the line in predetermined spaced relation for producing synchronized voltage pulses, and a gate circuit connected to each of said secondary coils and operated by a signal from the coincidence circuit for passing said synchronized pulses to a utilization circuit.

7. A receiving circuit for a communication system comprising receiving means for providing timed modulated current pulses responsive to a received pulse train, a magnetostrictive delay line, a receiving coil connected to the receiving means and enclosing a portion of said line for generating magnetostrictive pulses in the line, said pulses controlled by said pulse train, a plurality of primary coils enclosing portions of the line in predetermined spaced relation for producing synchronized pulses to identify and control said pulse train, a coincidence circuit connected to said primary coils which produces a gating signal only when actuated by all of said synchronized pulses, a plurality of secondary coils each enclosing a portion of said delay line in predetermined spaced relation for producing synchronized voltage pulses responsive to said modulated pulses, and a gate circuit connected to each of said secondary coils and operated by a signal from the coincidence circuit for passing said synchronized modulated pulses to a utilization circuit.

8. A receiving circuit as set forth in claim 7 wherein said modulated pulses include pulses having varying amplitudes to indicate information.

9. A receiving circuit as set forth in claim 7 wherein said coincidence circuit includes an electron discharge device having a plurality of control electrodes, each of said electrodes being coupled to one of said primary coils.

10. A receiving circuit as set forth in claim 7 wherein the spacing of the primary and secondary coils coincides with the spacing of the magnetostrictive pulses at one instant during their movement along the delay line.

References Cited in the file of this patent

UNITED STATES PATENTS

| | | |
|---|---|---|
| 2,485,591 | Greig | Oct. 25, 1949 |
| 2,495,740 | Labin et al. | Jan. 31, 1950 |
| 2,719,188 | Pierce | Sept. 27, 1955 |
| 2,816,169 | Pawley | Dec. 10, 1957 |